United States Patent Office 3,594,275
Patented July 20, 1971

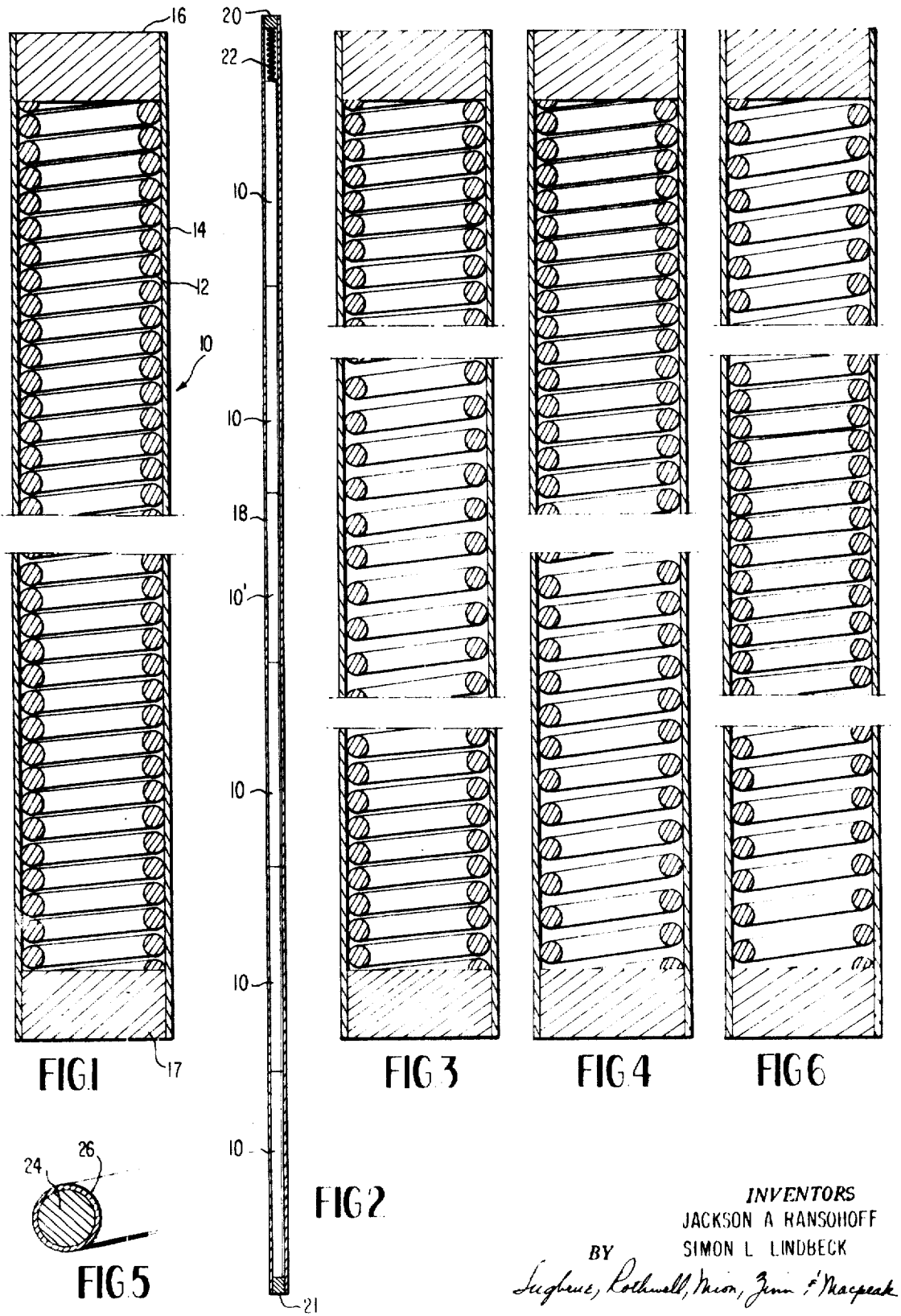

3,594,275
METHOD FOR THE PRODUCTION OF COBALT-60 SOURCES AND ELONGATED HOLLOW COILED WIRE TARGET THEREFOR
Jackson A. Ransohoff, Bethesda, and Simon L. Lindbeck, Bowie, Md., assignors to Neutron Products, Inc., Washington, D.C.
Original application Apr. 22, 1966, Ser. No. 544,508. Divided and this application May 14, 1968, Ser. No. 737,251
Int. Cl. G21c 1/00
U.S. Cl. 176—12
5 Claims

ABSTRACT OF THE DISCLOSURE

A unique method of producing cobalt-60 sources which accommodates both the needs of the reactor designer, the fuel cycle manager, and the cobalt-60 user is disclosed. The cobalt-60 source is produced by irradiating, in a nuclear reactor, natural cobalt wire which has been formed into a helical coil. The wire may be clad with a corrosion resistant material before winding, or the spring may be encapsulated in a corrosion protective cladding after it has been formed. The cobalt-60 sources produced may be used in the same geometry in which they are irradiated, or the geometry may be changed prior to use to affect a different distribution of activity.

CROSS REFERENCE TO RELATED APPLICATIONS

This application is a divisional of Ser. No. 544,508 filed Apr. 22, 1966, now abandoned.

This invention relates to improvements in the production of cobalt-60 which is commonly accomplished by irradiating naturally occurring cobalt in a nuclear reactor. Prior art practices have included the irradiation of cobalt in several forms: metal pellets and wafers, rods, strips, and straight wires.

To facilitate the production of cobalt-60 in commercial power reactors, it is desirable to provide the cobalt in a form which is easily fabricated, readily provided with a corrosion protective cladding, easily handled, and readily accommodated in the reactor. From a marketing standpoint, it is also desirable for the target to be in a form and shape which, upon completion of the irradiation, is readily adaptable for use in a variety of applications.

Since cobalt has an appreciable cross section (37 barns at 2200 m./sec.), it is generally desirable to limit the thickness of cobalt targets prepared for reactor irradiation in order to obviate the adverse effect of self-shielding on the specific activity of the product.

In some reactors, certain fuel tubes would be good target sites except that in most cases a tube filled with cobalt metal would, from nuclear considerations, contain too much target material. The Atomic Energy Commission has developed, and proposed as a standard for the industry, a plate form of target commonly known as BNL strip, a form not efficiently incorporated into normal fuel tubes. A preferable way to limit target density in a normal fuel tube would be to form the cobalt in the shape of a hollow cylinder, as might be made by drilling out a rod or forming a tube of cobalt metal. This would have the desired nuclear characteristics for irradiation and would be readily useful for many applications; however, targets fabricated in this manner would not be readily useful in many applications requiring an activity per unit length different than that of the irradiated target. For example they could not readily be used directly for solid sources such as are required in certain medical applications where both the specific activity and the activity per unit volume are required to be high; nor could sources made from tubular targets be easily compressed or expanded to provide modifications to the shape, or the activity per unit length.

Under prior art teachings cobalt has been irradiated in a form sufficiently dilute for purposes of irradiation and yet sufficiently compact for subsequent use by dispersing cobalt metal in the form of 1 mm. pellets, for example in a matrix, for the irradiation and subsequently removing the cobalt particles from the matrix after the irradiation has been completed. However, where the rate of reaction is high, heat transfer from a loose matrix of cobalt pellets could be a problem. The cobalt pellets could be dispersed and cast in aluminum for example for the irradiation and the aluminum could be subsequently removed by leaching. Or, heat transfer considerations permitting, cobalt pellets could be dispersed with stainless pellets or shot and subsequently separated by magnetic or mechanical means. In any event, cobalt-60 produced in a dispersion or mixture would not be directly usable, at good efficiency, for many industrial applications.

Similarly, the so-called BNL strip, which is easily used for certain industrial processes, is not truly versatile even for its intended use and is not readily useful in the preparation of medical-grade sources. In summary, present art admits of a variety of target configurations, depending upon the intended use, but none of the prior art target configurations are truly versatile from nuclear and end use considerations.

It is the purpose of the present invention to provide a unique method whereby cobalt can be readily and efficiently irradiated in nuclear reactors in a form which has desirable characteristics for subsequent use in a variety of applications by providing unique configurations of the cobalt target. This invention also teaches methods for adapting, for a variety of uses, the cobalt-60 produced by the irradiation of the target form of this invention.

Consider for example, the irradiation of cobalt in a normal power reactor fuel tube with an inside diameter of 0.282". If filled with a solid clad cobalt rod, the target content of the tube would be about 3.5 gms./cm. of tube length. In order to avoid excessive self-shielding of the cobalt, however, it is desirable to limit target density to a much lower level, say about 1.2 gms./cm. of tube length. As noted previously, this could be accomplished without innovation by filling the tube with hollow cylinders of cobalt or, alternatively, hollow cylinders of cobalt could be clad or sealed in inner tubes so as to provide a double encapsulation. Cobalt-60 produced in this manner would most conveniently be used in applications, and there are many, where rigid hollow cylinders would be satisfactory. By practicing the teachings of the present invention, however, it would be practical to provide a target which would satisfy the performance criteria for sources which either may be or must be hollow, while at the same time permitting the production of source material which could, if desired be readily incorporated into sources having a cobalt density either higher or lower than the density of the target. By the teachings of the present invention, nuclear characteristics comparable to those obtained by the use of a hollow cylinder are realized by use of cobalt wire wound in the form of an elongated hollow coil such as a common screen door spring. After irradiation, the coil could be used in its relaxed length, or it could be compressed to provide a higher activity per unit length, or it could be stretched to provide a source of lower activity per unit length.

Alternately, the spring could be unwound and used as wire, or chopped into tiny pellets. Depending upon the irradiation and fabrication history, annealing may be necessary to facilitate unwinding of the spring.

As previously mentioned, encapsulation of the coil is usually desired both for the irradiation itself and, except in cases where the coil is to be destroyed, for subsequent use. This can be accomplished either by placing an unclad cobalt coil inside a sealed container or by cladding the cobalt wire directly as with stainless steel, or other impermeable protective coating so as to provide an intimate protective cladding.

Other objects of the invention will be pointed out in the following description and claims and illustrated in the accompanying drawings, which disclose by way of example, the principle of the invention and the best mode which has been contemplated of applying that principle.

In the drawings:

FIG. 1 is a longitudinal sectional view through an encapsulated target unit of this invention;

FIG. 2 is a longitudinal sectional view of a plurality of individual target units further encapsulated in an elongated tube;

FIG. 3 is a longitudinal sectional view illustrating one form of variation in spacing of a target unit;

FIG. 4 is a longitudinal sectional view illustrating another form of variation in spacing of the helical turns of a target unit;

FIG. 5 is a sectional view of a clad helical target; and

FIG. 6 is a sectional view showing another variation in helical turn spacing of the target unit.

FIG. 1 shows a once-encapsulated target unit 10 of a uniform helical coil 12 of cobalt encapsulated in a suitable structure and protective cladding such as a stainless steel tube 14, capped on the ends by caps 16, 17.

FIG. 2 shows a twice-encapsulated target assembly including several capped tube target units 10 of the type shown in FIG. 1, re-encapsulated in a second container such as a zircaloy fuel tube 18. The tube 18 may be capped at top and bottom by caps 20, 21 and a spring 22 may be used to hold down the target units.

The individual target units 10 and 10' may each contain the same cobalt content per unit of length, or for axial power flattening the centermost encapsulated targets along the axis of the fuel rod may contain a higher concentration of cobalt. Also the individual rods may be of identical length or they may be of differing lengths, thereby permitting the ready identification of individual target positions along the axis of the target assembly after disassembly at the conclusion of the irradiation.

First actual practice of the art taught herein is currently being practiced in the loading of target rods for the first production of cobalt-60 in a commercial power reactor near Charlevoix, Mich. In this particular case each target assembly tube contain five target units 10 of the type shown in FIG. 1 which are twelve inches long and one target 10' which is ten inches long. The ten inch unit 10' is located fourth from the bottom of the target assembly tube (see FIG. 2), a position which is expected to experience the highest integrated neutron flux during the planned irradiation. This enables the highest specific activity targets in each assembly tube to be readily identified, a matter of some economic importance in view of the substantial premium brought by the sale of high specific activity material.

Further discussion of the first actual reduction to practice of the present invention will serve to illustrate the versatility of the method. A cobalt content of 1.15 gm./cm. of target length was required. A portion of the coils were fabricated by winding 0.046" wire to produce a helical coil with an outer diameter of 0.245" and a spacing of about twenty turns per inch. By straight mathematical conversion the fully compressed coil would contain a quantity of cobalt equivalent to about 45% of that which a solid rod of the same outer diameter would contain. An inadequate supply of 0.046" wire was available on a timely basis, however; and accordingly the outer coils were produced by winding 0.060" wire to produce a helical coil of the same outer diameter, the same cobalt concentration being achieved by winding approximately 12 turns to the inch.

As a corollary, different linear concentrations of cobalt can be achieved using wire of the same diameter by varying the pitch of the winding to achieve the desired linear concentration at any point.

A further improvement in the art as described by the present inventive process can be achieved by varying the pitch of the coil within a single rod as shown in FIG. 3. In FIG. 3 the coil pitch is smallest at the ends and largest in the center. Incorporating this type of turn spacing could yield a relatively uniform activity per unit length of target even though irradiated in a reactor where the flux were relatively high in the center portion of the target and relatively low at the ends. This type of flux variation is common, since in most reactors there is a decided variation in neutron flux, peaking near the center, along the axis of the fuel assemblies. The variation in turn spacing will be determined by the details of the flux distribution, but in any event the design criteria is to provide a turn spacing wherein the product of flux and macroscopic cobalt cross section is essentially the same (say $\pm 10\%$) at every point along the axis of the target. The one disadvantage in the configuration shown in FIG. 3 results from the fact that the higher concentration of cobalt in regions of lower flux tends to aggravate the natural difference in power distribution which would accompany the flux nonuniformity. Nevertheless the method is operable in circumstances where the reactivity effect of the cobalt is of minor significance.

Similarly, in an individual target positioned at the end of a target assembly which runs the length of a reactor core, end effects may be compensated by a varied turn spacing such as that shown in FIG. 4, wherein the design criteria would be the same as that stated immediately above.

Variable turn spacing in construction of a target to provide a source of uniform activity along its axis is most useful in cases where a bare cobalt coil is contained within a sealed capsule, since any variation in coil spacing after irradiation is inconvenient due to the need to open the capsule in order to change the coil orientation. One would then be obliged to provide two new encapsulations, whereas use of the irradiated target as is, would require only one additional encapsulation of the irradiated material and no delicate hot cell manipulations.

More flexibility in the utilization of variable turn spacing is provided by the use of a directly clad wire with which to produce the helical coil as shown in FIG. 5 where cobalt wire 24 has a coating 26 of stainless steel or other suitable material clad directly thereon. Applying the teachings of the present invention, one could place a coil of this wire directly within the fuel tube since the protective coating would serve as a first encapsulation of the cobalt. If the spacing of the coils in the target assembly were kept uniform, variations in activity along the length of the coil which would derive from exposure to a nonuniform flux could be compensated by increasing the space between turns subsequent to irradiation and prior to the post-irradiation encapsulation. Alternatively, if it were decided to vary the coil spacing along the length of the target in order to provide an axial power flattening effect as shown in FIG. 6, the nonuniformity of activity along the length of the coil could be subsequently corrected by compressing the ends of the coil (and perhaps extending the center) after the irradiation has been completed and before the post-irradiation encapsulation.

In effecting controlled and variable turn spacing, one may use clamps or rods with spacers or any other means which would enable one to gather a prescribed number of turns within a given length. The method of setting turn spacing is not considered to be innovative as many alternatives are open to the user within the realm of obvious art.

While the invention has been particularly shown and described with reference to preferred embodiments thereof, it will be understood by those skilled in the art that the foregoing and other changes in form and details may be

We claim:
1. A method of producing a cobalt-60 source comprising:
   (a) cladding a cobalt natural wire with a corrosion resisting material and forming said wire into an elongated hollow coil of helical form, the elongated coil having a length substantially greater than its diameter,
   (b) establishing a cobalt concentration not greater than 45% of the concentration of a cobalt rod having a diameter the same as the outside diameter of the helical coil, this concentration to be established by fixing the following parameters: wire diameter, coil diameter, number of coils per unit length,
   (c) encapsulating the elongated hollow helical coil of natural cobalt in a corrosion resistant container,
   (d) irradiating the elongated hollow helical oil of natural cobalt in a nuclear reactor, and
   (e) removing the irradiated helical coil from the reactor and using the irradiated colbalt as a radioactive source.

2. A method as in claim 1 further comprising removing the irradiated hollow helical coil from the encapsulation and altering the physical dimensions thereof so as to concentrate the activity within a smaller volume than the volume defining the hollow helical coil and encapsulating the altered material.

3. A method as in claim 2 wherein the change in physical dimensions is accomplished by segmenting.

4. A method as in claim 1 further comprising forming the irradiated hollow helical coil of irradiated cobalt into a source having a different activity per unit length than the coil in its as irradiated configuration.

5. A method as in claim 4 wherein the change in activity per unit length is accomplished by varying the spacing of coil turns along the length of the irradiated hollow helical coil after irradiating.

References Cited

UNITED STATES PATENTS

| | | | |
|---|---|---|---|
| 2,852,456 | 9/1958 | Wade | 176—86 |
| 2,905,612 | 9/1959 | Borst | 176—86 |
| 2,964,628 | 12/1960 | Ohmart | 250—106S |
| 3,049,484 | 8/1962 | Zinn | 176—15 |
| 3,138,534 | 6/1964 | Frisch et al. | 176—15 |
| 3,275,525 | 9/1966 | Bloomster et al. | 176—90 |
| 3,297,544 | 1/1967 | Hooper et al. | 176—90 |
| 3,325,363 | 6/1967 | Goeddel et al. | 176—93 |
| 3,335,064 | 8/1967 | Whittaker et al. | 176—15 |

FOREIGN PATENTS

| | | | |
|---|---|---|---|
| 1,322,339 | 2/1963 | France | 176—56 |
| 1,382,777 | 11/1964 | France | 176—93B.P. |
| 854,825 | 11/1960 | Great Britain | 176—15 |

CARL D. QUARFORTH, Primary Examiner

H. E. BEHREND, Assistant Examiner

U.S. Cl. X.R.

176—15; 250—106